United States Patent [19]
Takagi et al.

[11] 3,954,215
[45] May 4, 1976

[54] APPARATUS FOR ROTARY BI-AXLE TYPE FRICTION WELDING

[75] Inventors: Nobuo Takagi, Kariya; Takeshi Kubo, Oobu; Takashi Takiguchi, Kariya, all of Japan

[73] Assignee: Kabushiki Kaisha Toyoda Jidoshokki Seisakusho, Japan

[22] Filed: Mar. 20, 1974

[21] Appl. No.: 452,818

Related U.S. Application Data

[62] Division of Ser. No. 212,910, Dec. 28, 1971, Pat. No. 3,819,339.

[30] Foreign Application Priority Data
Dec. 30, 1970 Japan.............................. 45-123068

[52] U.S. Cl................................. 228/2; 156/73.5; 228/112
[51] Int. Cl.² ....................................... B23K 27/00
[58] Field of Search....................... 228/2; 29/470.3; 156/73

[56] References Cited
UNITED STATES PATENTS

| | | | |
|---|---|---|---|
| 3,538,592 | 11/1970 | Padilla................................... | 228/2 |
| 3,549,076 | 12/1970 | Mills...................................... | 228/2 |
| 3,595,462 | 7/1971 | Mirayama........................... | 29/470.3 |
| 3,623,213 | 11/1971 | Sciaky et al. ......................... | 228/2 |
| 3,678,566 | 7/1972 | Ellis et al................................ | 228/2 |
| 3,712,528 | 1/1973 | Takagi et al........................... | 228/2 |
| 3,735,910 | 5/1973 | Watson et al........................... | 228/2 |
| 3,743,162 | 7/1973 | Gage...................................... | 156/73 |
| 3,750,927 | 8/1973 | Miller et al............................. | 228/2 |
| 3,753,820 | 8/1973 | Ishikawa et al....................... | 156/73 |

*Primary Examiner*—Al Lawrence Smith
*Assistant Examiner*—Robert C. Watson
*Attorney, Agent, or Firm*—Burgess Ryan and Wayne

[57] ABSTRACT

This disclosure relates to an apparatus for friction welding wherein an improved friction welding of a first and a second workpieces are carried out in a manner such that welded and plasticized workpieces are rapidly synchronized and also a larger thrust is provided at only the end stage of the welding so that change of metallic structure of welded workpieces due to cooling which tends to cause cracks in the welded portion is prevented.

In order to carry out this improved friction welding, the apparatus for friction welding includes a second driving means for driving the second workpiece, detecting means for detecting the sum of the lengths of welded workpieces capable of providing a signal for interrupting the drive of the first workpiece and hydraulic systems capable of adjusting the thrust according to a signal from the detecting means.

22 Claims, 12 Drawing Figures

APPARATUS FOR ROTARY BI-AXLE TYPE FRICTION WELDING

This is a division of application Ser. No. 212,910, filed Dec. 28, 1971, now U.S. Pat. No. 3,819,339.

The present invention relates to an improvement in the method for rotary bi-axle type friction welding and an apparatus to carry out the improved method.

There is a conventional method and an apparatus for bi-axle type friction welding in which the first workpiece rotating at high-speed and the second rotatable workpiece coaxially facing the first workpiece are brought into friction contact under the action of an axial thrust force so as to be welded to each other while the extrusion of a welding fin produced by the action of frictional heat generated at the contact surfaces of both workpieces being welded and the above-mentioned axial thrust force, is removed continuously by using the rotational motion of the workpieces being welded and further, the generation of heat required for friction welding terminates when the relative rotational speed of both workpieces becomes zero.

However, in the above-mentioned conventional rotary type bi-axle friction welding method, the following drawbacks are encountered.

1. Generally, as the rotation of the second workpiece is synchronized with the high speed rotation of the first workpiece, the driven spindle holding the second workpiece retains large kinetic energy even after completion of friction welding of both workpieces and therefore, a braking apparatus of large capacity is necessary not only for converting the large kinetic energy to thermal energy while braking the driven spindle but also for absorbing the heat of the conversion.

As a result of this, a friction welding apparatus is required which is large in its overall dimensions.

2. As adjustment of the energy required for friction welding is carried out mainly by adjusting the moment of inertia of the flywheel; stepless or continuous adjustment can not be performed and is accompanied by extreme difficulties in the adjusting operation.

3. Because of the presence of cutting resistance in removing the welding fin while the frictional heat is being generated, and of variation of the idling torque loaded to the driven spindle, the friction welding energy varies and thus the overall length of the welded workpieces tends to be irregular on completion of the welding.

4. As it takes a long time to reach synchronization of rotations of both workpieces from the start of the operation change of metallic structure is caused by the cooling of both workpieces during their long relative motion and thus poor welding tends to result, which weakens the junction at the welded portion of both workpieces. This defect is prominent in workpieces of small diameter and therefore, of small thermal capacity and also, when welding some particular materials such as heat resisting steel having extremely bad weldability.

The principal object of the present invention is to attain rapid synchronization between the rotations of both workpieces in the relatively low rotational speed range by stopping the application of driving power to the main spindle holding the first workpiece being welded while frictional heat is still being generated.

Another object of the present invention is to obtain workpieces having a constant length after completion of friction welding by the above-mentioned stopping of the application of driving force to the main spindle based upon the command from the detection of the sum of the lengths of the workpieces which have been frictionally welded.

A further object of the present invention is to adjustably maintain the low rotational speed of the driven spindle which holds the second workpiece to be welded by arranging means for continuously adjusting welding energy instead of the conventional flywheel.

Still another object of the present invention is to prevent weakening at the junction of the welded portion of the workpieces by momentarily applying increasing thrust at the end period of the generation of frictional heat so that additional heat is provided so as to boost the welding heat immediately before reaching synchronization between the first and the second workpieces and also so that the synchronization between both workpieces can be attained quicker.

The method and apparatus for rotary bi-axle type friction welding in accordance with the present invention will be apparent from the ensuing description of typical embodiments of the present invention with reference to the accompanying drawings wherein.

Firstly, the friction welding apparatus of the present invention shown in FIGS. 1 and 2 will be explained in detail.

Figure 1:
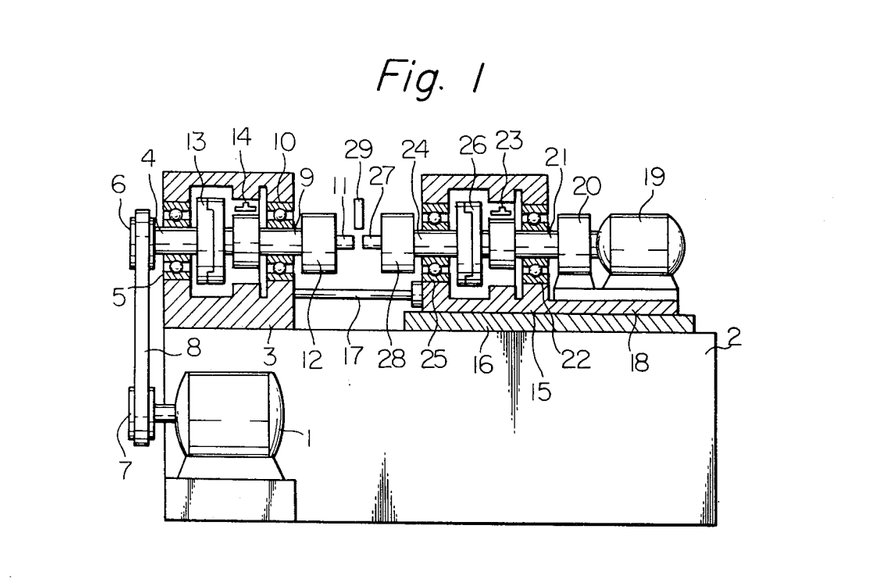
FIG. 1 is a schematic front view including a partially sectional view of an embodiment of a friction welding apparatus according to the present invention.
Figure 2:
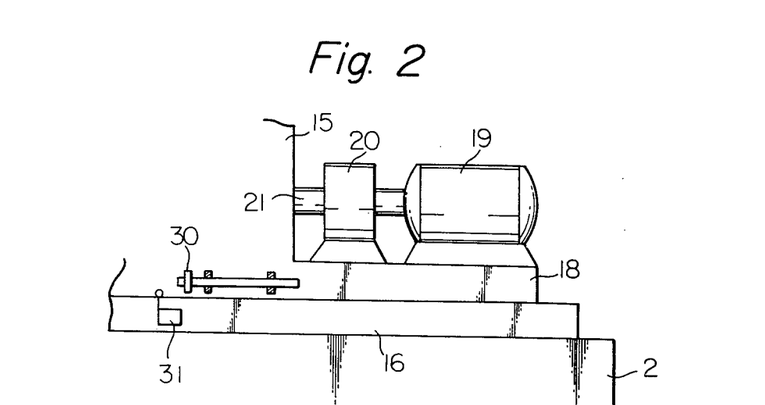
FIG. 2 is an illustrative partial view showing means for detecting the sum of the lengths of the two workpieces in the apparatus of FIG. 1.

Referring to FIGS. 1 and 2, a main driving motor 1 is mounted on a suitable portion of bed 2 of the friction welding apparatus. A main platform 3 is fixedly mounted on side (the left hand side in FIG. 1) of bed 2, while at the left hand side of platform 3, the first main spindle 4 is rotatably supported by bearing 5. Between a driven pulley 6 attached to the left end of the main spindle 4 and a driving pulley 7 of main driving motor 1, a belt 8 is connected. A second main spindle 9 is rotatably supported by bearing 10 at the right hand side of main platform 3 so as to be coaxial with first main spindle 4 and, a chucking member 12 for holding a first workpiece 11 is fixedly attached to the right hand end of the second main spindle 9.

A clutch means 13 is disposed between the first main spindle 4 and the second main spindle 9.

A braking means 14 is disposed at a portion of main platform 3 so as to be capable of providing a braking action on the second main spindle 9. A subordinate platform 15 is mounted on a base 16 fixed on the other side (the right hand side in FIG. 1) of bed 2 so as to be capable of axially moving back and forth along base 16, and is also coupled with a piston rod 17 of a thrust cylinder (not shown in FIG. 1). A secondary driving motor 19 and a transmission means 20 directly connected to the secondary driving motor 19 are placed on a support plate 18 which extends from the right hand end of the subordinate platform 15 along base 16. A first subordinate spindle 21 is rotatably supported by bearing 22 in the right hand side of subordinate platform 15, and one end of first subordinate spindle 21 is connected to transmission means 20.

A braking means 23 positioned at a suitable portion of subordinate platform 15 is capable of providing braking action to the first subordinate spindle 21. A second subordinate spindle 24 is rotatably supported by a bearing 25 in the left hand side of subordinate platform 15 coaxial with the first and second main spindles 4, 9 and first subordinate spindle 21. The second subordinate spindle 24 couples with the first subordinate spindle 21 at the right end of spindle 24 by way of clutch means 26 disposed therebetween, and to the left hand end of the second subordinate spindle 24, there is attached a chucking means 28 for holding a second workpiece 27 which faces first workpiece 11.

Reference numeral 29 shows a cutting tool used for removing the welding fin of the workpieces to be welded.

Referring now to FIG. 2, a dog member 30 is attached to a portion of subordinate platform 15 so as to cooperate with a limit switch 31, and according to a command signal from this limit switch 31, e.g. the disconnection of clutch means 13 is carried out.

Figure 3:
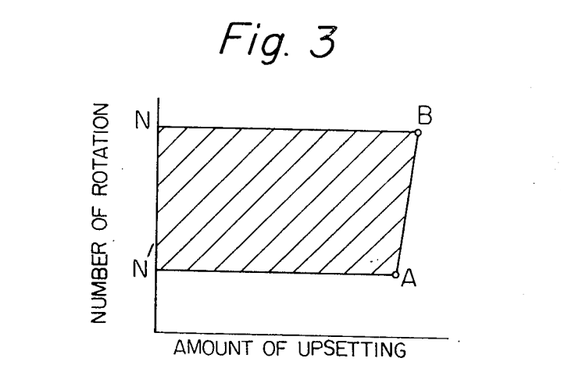
FIG. 3 to FIG. 5 are graphical diagrams showing the relationship between the number of revolutions of the workpieces and upsetting amount of workpieces in connection with illustration in operation of the friction welding apparatus of FIG. 1.

Now, the operation and effects of this embodiment of the present invention will be more apparent from the following description referring to FIG. 1 to FIG. 3.

When main driving motor 1 is activated, the first main spindle 4 is driven by motor 1 by way of driving pulley 7, belt 8, and driven pulley 6 and then the second main spindle 9 is caused to rotate by the clutch means 13, and as a result the first workpiece 11 held by chucking member 12 of second main spindle 9 rotates at a predetermined rotational speed N. When the secondary driving motor 19 is activated, the first subordinate spindle 21 is driven by the motor 19 by way of transmission means 20 at a controlled rotational speed. The rotation of the first subordinate spindle 21 is then transmitted to a second subordinate spindle 24 by clutch means 26, so that the second workpiece 27 held by chucking member 28 rotates at a rotational speed N' which is smaller than the rotational speed N. In these different rotating states of both workpieces, when the subordinate platform 15 is gradually advanced along piston rod 17, the second workpiece 27 is brought into contact with first workpiece 11, and frictional heat generates at the contact surfaces of both workpieces due to the relative motion between both contact surfaces, so that portions at the contact surfaces are brought into a plasticized state, and therefore, the subordinate platform 15 under a constant thrust force gradually advances corresponding to the advance of the welding process in the above-mentioned plastic portions of both workpieces 11 and 27.

When the sum of the lengths of both workpieces 11 and 27 reaches a preselected value, (the value is shown as point A in FIG. 3), detecting means, such as a limit switch, detects the value and then, the clutch means 26 of the subordinate spindle system is disconnected by a command signal from the detecting means so as to release the second subordinate spindle 24 from a constant low speed rotation. The second workpiece 27 now follows the rotational motion of the first workpiece 11 and the rotations of both spindles rapidly synchronize with each other (point B of FIG. 3), so that generation of frictional heat at the contact surfaces of both workpieces 11 and 27 ceases and the friction welding process is completed after application of additional thrust for a 1 minute period.

The welding fin produced at the welded portion of both workpieces is continuously removed by a cutting tool 29.

The area shown by oblique lines in FIG. 3 indicates the welding energy necessary for friction welding of the workpieces 11 and 27 at their contact portions.

This welding energy can be freely adjusted by selectively controlling the disconnecting time of the subordinate spindle system from the secondary driving source which time is determined from the welding conditions such as material and diameter of workpieces.

The above-mentioned controlling of the disconnecting time is carried out by the detection of the upsetting amount of workpieces to be welded.

As explained above, in this embodiment of the present invention, both spindle systems are provided with driving motors, and the second workpiece of the subordinate spindle system which rotates at a predetermined low speed, makes frictional contact with the first workpiece of the main spindle system which rotates at a speed higher than said predetermined low speed of the subordinate spindle system and then, when the sum of the lengths of both workpieces reaches a preselected value, the subordinate spindle system is disconnected from its driving source so that both spindle systems quickly synchronize with each other. As a result of this, as cutting resistance and variation of the idling torque can be decreased during the process of the removal of the welding fin, the variation of the sum of the lengths of both workpieces after friction welding can be reduced to a minimum.

Also, as the moment of inertia of the second subordinate spindle can be made the smallest possible value, the period immediately before the synchronization of both spindle systems wherein large torque is generated, can be shortened and accordingly the maximum values of the torques generated on both spindle systems can be held to low values. As a result of this, junction strength of the welded portions of both workpieces is remarkably increased. Further as adjustment of the energy used for friction welding can be carried out by changing the rotational speed of the subordinate spindle system, the conventional flywheel is unnecessary and easy adjustment is obtainable.

The operation of the above-mentioned friction welding apparatus can also be controlled as follows.

Firstly, both workpieces 11 and 27 rotating at high and low speeds, respectively, are brought into contact with each other so as to generate frictional heat at the contact surfaces of both workpieces and the contact portions of both workpieces 11 and 27 are plasticized by the frictional heat. When the sum of the lengths of both workpieces reaches a predetermined value (point A of FIG. 4) by gradually advancing the subordinate platform 15, dog-leg 30 provided on the subordinate platform 15 comes into contact with limit switch 31 provided on base 16 when the signal from limit switch 31 actuates clutch means 13 of the main spindle system so as to disconnect the second main spindle 9 from first main spindle 4 in order to release second main spindle 9 from being driven at high rotational speed, the main spindle system containing the first workpiece 11 quickly decreases in rotational speed due to the action of friction force generated at the contact surfaces of the workpieces 11 and 27. Then the main spindle synchronizes with the rotation of subordinate spindle system (at the point B of FIG. 4) rotating at a preselected rotational speed N' so as to enable the removal of the welding fin by means of cutting tool 29 to be carried out. Thus, generation of frictional heat at the junction of both workpieces 11 and 27 is stopped and the friction welding process is completed after application of an additional thrust force for a minute period. Then, both spindle systems are stopped by means of respective braking means 14 and 23 (at the point C of FIG. 4). However, as described above, the rotational speed at which both workpieces are synchronized, is small, so that the kinetic energy remaining in both spindle systems is extremely small compared with the conventional method and as a result the above-mentioned stopping operation by both braking means 14 and 23 is easily carried out.

Figure 4:
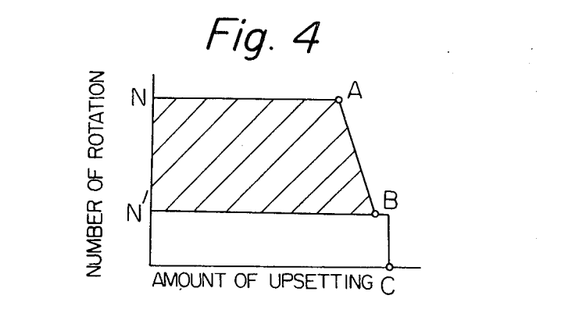

The above explanation is described referring to FIG. 4 in which, as soon as the sum of the lengths of both workpieces to be welded reaches a predetermined value (at point A), the second main spindle 9 only is released from the frictional driven motion by the signal from limit switch 31 so as to quickly synchronize both spindle systems (at point B), and thereafter, both spindle systems are stopped by the braking means 14 and 23. However, quicker synchronization of both spindle systems is obtainable (point E of FIG. 5), if the subordinate spindle system is released from the driving source by disconnecting the clutch means 26 as commanded by the signal from limit switch 31 as soon as the sum of the lengths of both workpieces 11 and 27 reaches a predetermined value (point D of FIG. 5).

In this case, the kinetic energies of both spindle systems are considerably reduced so that thermal energies generated in braking means 14 and 23 are as small as in the case of FIG. 4.

Figure 5:
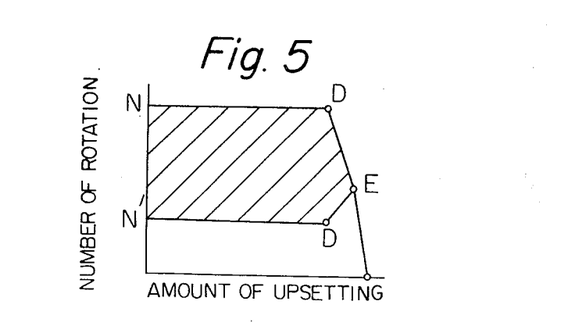

The areas shown by oblique lines in FIG. 4 and FIG. 5 indicate welding energies necessary for friction welding in the above-mentioned respective cases.

These welding energies can be freely adjusted by selectively controlling the disconnecting time of main spindle system or the disconnected times of the main spindle system and subordinate spindle system from their driving source, which time is determined from the welding conditions such as materials and sizes of workpieces.

The above-mentioned control is carried out based upon the detection of the amount of upsets of the workpieces.

As explained above, these operation methods in the friction welding apparatus of the present invention provide the same effects as the method explained with reference to FIG. 3. Since the main spindle system rotating in a high speed range is released from the driving source when the sum of lengths of workpieces, reaches a predetermined value so that main spindle system and subordinate spindle systems are quickly synchronized with each other in a low rotational speed range, the kinetic energies remaining in both spindle systems after completion of friction welding are quite small. As a result, the braking means for stopping both spindle systems need not be capable of absorbing large quantities of heat and also, can be made small in capacity and overall size.

Figure 6:
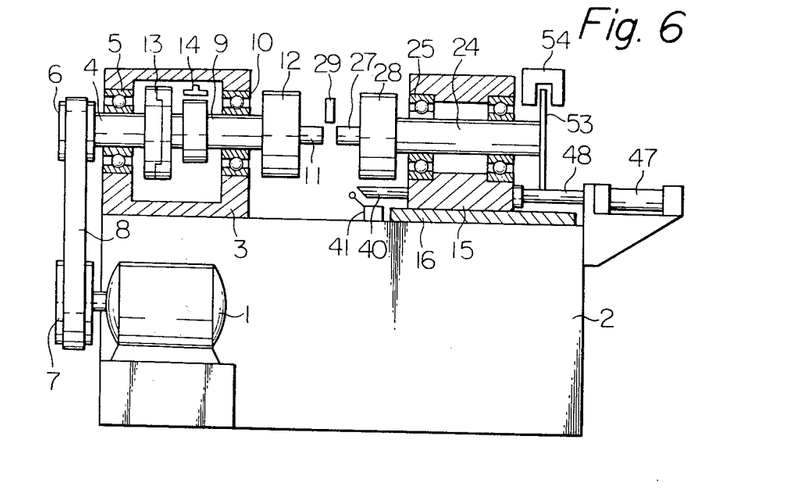
FIG. 6 is a schematic front view of another embodiment of a frictional welding apparatus according to the present invention.
Figure 7:
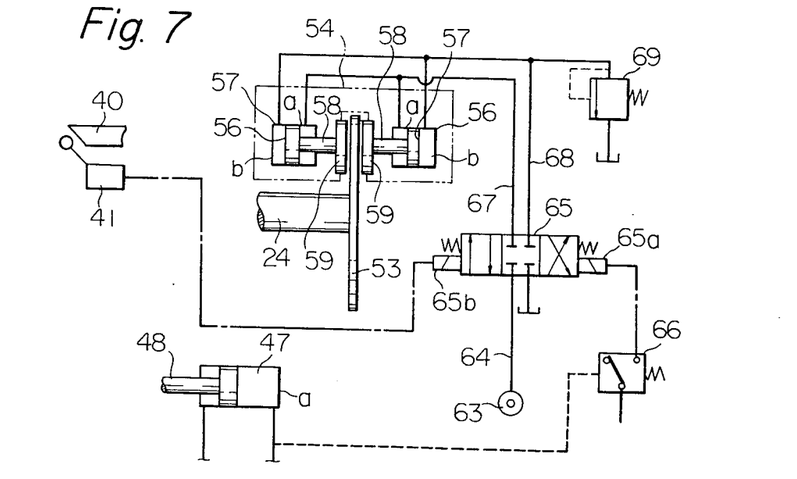
FIG. 7 is a schematic drawing illustrating the hydraulic circuit applied to the apparatus of FIG. 6.
Figure 8:
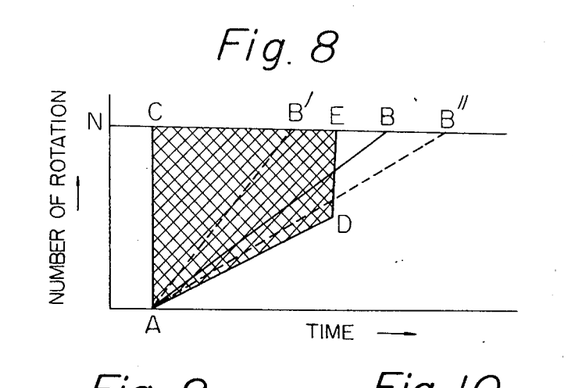
FIG. 8 is a graphical diagram showing the relationship between the number of revolutions of workpieces and time in connection with the illustration of the operation of the friction welding apparatus of FIG. 6.

The friction welding apparatus shown in FIGS. 6 and 7 illustrates another embodiment of the present invention.

In this rotary bi-axle type friction welding apparatus, a particular operation is carried out in such a manner that during the generating process of frictional heat due to the friction contact between the first workpiece of the motor driver rotating main spindle system and the second workpiece of the frictionally driver rotating subordinate spindle system, the subordinate spindle system is continuously partially braked so as to suitably restrain it from increase in rotational speed, and thereafter when the sum of the lengths of both workpieces reaches a predetermined value, the above-mentioned partial braking applied to the subordinate spindle system is released so as to synchronize the rotations of both spindle systems.

As will be understood from FIG. 6, the arrangement and function of the main spindle system is quite similar to the previous embodiment, therefore, the arrangement and function of subordinate spindle system only will be principally explained.

Referring to FIGS. 6 and 7, there is mounted on base 16 fixedly positioned on the right hand side of bed 2, a subordinate platform 15 capable of sliding back and forth and coupled with piston rod 48 of a hydraulic cylinder 47 fixed to a suitable portion on bed 2. Subordinate spindle 24 is rotatably supported by subordinate platform 15 by bearings 25 so as to be coaxial with the first and second main spindle 4 and 9. At the left hand end of subordinate spindle 24, there is fixed a chucking member 28 for holding a second workpiece 27 facing first workpiece 11 so as to face the chucking member 12 of first workpiece 11 and to the right hand end of subordinate spindle 24, a brake disc 53 is fixedly connected. On the above-mentioned subordinate platform 15, there is mounted the main body 54 of the braking device in which hydraulic cylinders 56 are symmetrically arranged while facing each other. In both hydraulic cylinders 56, there are fitted pistons 57, of which the piston rods 58 have pads 59 attached to the inner ends of piston rods 58 which press against the above-mentioned brake disc 53 so as to apply a brake to the subordinate spindle 24.

Dog-leg 40 projecting from the front end surface of the subordinate platform 15 is capable of actuating the limit switch 41 provided at a suitable position on base 16 or bed 2. A cutting tool 29 is provided for removing the welding fin.

Next, the electric and hydraulic circuits of this embodiment shown especially in FIG. 7 will be explained.

Directional control valve 65 connected to hydraulic power source 63 by means of oil line 64 is properly operated by solenoid 65a electrically connected to pressure switch 66 which is switched "ON" when the hydraulic pressure within cylinder chamber (a) of the above-mentioned hydraulic cylinder 47 reaches a predetermined value, and by solenoid 65b which is electrically connected to limit switch 41.

Oil line 67 connected to directional control valve 65 at one end thereof, runs to piston rod sides (a) within the cylinder 56, while oil line 68 branching into two lines on the way, runs to head sides (b) within the cylinder 56 on the one hand and also runs to relief valve 69 on the other hand so as to maintain the pressure within the head sides (b) at a predetermined value.

The operation and the effect of this embodiment will now be explained in detail.

In the state of continuous rotation of main spindle system driven by the driving motor 1, subordinate platform 15 is advanced (to the left in FIG. 6) by supplying hydraulic fluid to operate piston rod 48 into the cylinder chamber (a) of the hydraulic cylinder 47 and the second workpiece 27 held by chucking member 28 comes into contact with the first workpiece 11 of the main spindle system under a preselected thrust.

The friction force generated at the contact of both workpieces 11 and 27 causes the subordinate spindle system including second workpiece 27 to rotate, and at the same time when the hydraulic pressure within cylinder chamber (a) of hydraulic cylinder 47 rapidly rises to a predetermined value, pressure switch 66 is switched "ON" and operates solenoid 65a, and thereby directional control valve 65 is switched (to the left in FIG. 7) so as to connect oil line 64 with line 68.

As a result of the above operation, hydraulic fluid is supplied to the head-sides (b) of the hydraulic cylinder 56 and pads 59 attached to piston rods 58 are forced into contact with the surfaces of brake disc 53 so that a brake force is applied to the subordinate spindle system.

As the hydraulic pressure within both head sides (b) of hydraulic cylinder 56 is controlled at a suitable value by means of relief value 69, the above-mentioned brake force applied to the subordinate spindle system is a partial brake force and therefore, the rotational speed of the subordinate spindle system accelerates more slowly.

Then, as the junction of both workpieces is plasticized by frictional heat, subordinate platform 15 gradually advances so that dog-leg 40 comes in contact with and actuates limit switch 41 when the sum of the lengths of both workpieces reaches a predetermined value.

Therefore, solenoid 65b is actuated to directionally control valve 65 (to the right in FIG. 7) so as to connect oil line 64 with oil line 67. At that time, solenoid 65a is automatically switched to the "OFF" position.

As a result of the above-mentioned operation, hydraulic cylinders 56 are supplied with hydraulic fluid at their sides (a), so that pads 59 attached to piston rods 58 withdraw so as to release the brake force applied to brake disc 53, and therefore, the rotation of the subordinate spindle system is rapidly accelerated so as to synchronize with the rotation of the main spindle system. Generation of frictional heat at the junction of both workpieces now ceases and the friction welding of both workpieces is completed.

In the above-mentioned operation, it is, of course, possible to carry out an additional operation in a similar manner to the previous embodiment in which clutch means 13 is disconnected by the signal from the limit switch 41 so that the synchronized rotational speed of both workpieces is lower and further, the synchronizing occurs earlier.

Also, the arrangement of this embodiment may differ from that of the previous embodiment in the point that the subordinate spindle system of the later embodiment is arranged so as to be given a partial braking force the same as in the conventional system, while subordinate spindle system of the former embodiment is positively driven by a driving source.

However, the concepts of both embodiments do not differ from each other, since the subordinate spindle systems in both embodiments are restrained from the increase of rotational speed which would occur under the frictional driving torque at the contact surfaces of both workpieces to be welded.

Therefore, it will be understood that a similar effect is obtainable in the latter embodiment.

As mentioned in the introductory description, in the conventional rotary type bi-axle friction welding method, the time required for synchronizing of both workpieces after the commencement of the decrease of relative rotational speed between them is very long, and the synchronizing time tends to be substantially prolonged. As a result of this, while the relative rotational speed between both workpieces is decreasing, the junction of both workpieces cools down accompanied by a variation of the metallic structure thereof and as a result unsuitable welding materials such as heat resisting steel is often poorly welded.

Figure 11:
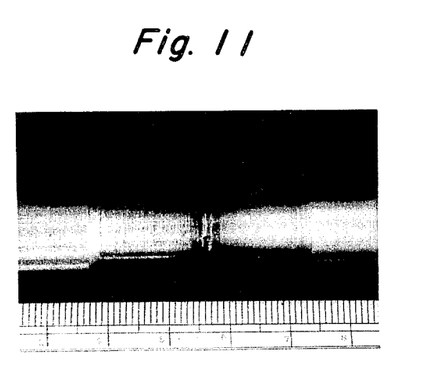
FIGS. 11 and 12 are photographs illustrating a poorly welded portion and its cross sections.
Figure 12:
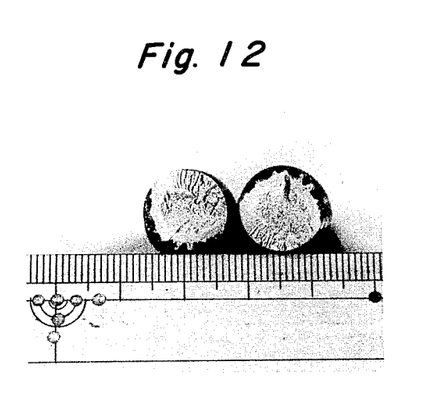

Now, the results of laboratory welding of test pieces of the heat resisting steel bar of Japanese Industrial Standard class G 4302 No. 3 and No. 31 (SUH 3B and SUH 31B) which was carried out by the inventors under the friction welding conditions shown in Table I using the conventional friction welding apparatus, are shown in FIG. 11 and FIG. 12 of the accompanying photographs. As is seen from the photographs, almost all the test pieces formed cracks at the welding junction.

Table I

| Items | Conditions |
|---|---|
| Diameters of test pieces | 13 mm |
| The revolutional number of the main spindle system | 2400 r.p.m. |
| Thrust pressure | 16 kg/mm$^2$ |
| Specific energy | 5 kg.m/mm$^2$ |

Figures 9, 10:
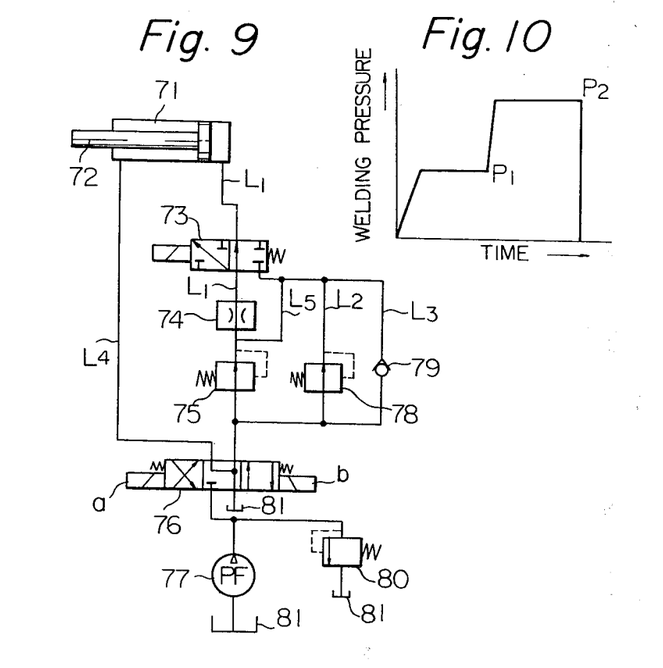
FIG. 9 is a schematic drawing of the hydraulic circuit used for the principal control of the thrust in the friction welding apparatus according to the present invention.
FIG. 10 is a graphical diagram showing the relationship between welding pressure and time in connection with illustration of action of the hydraulic circuit of FIG. 9.

However, these defects are completely removed by using the two stage pressure method shown in FIG. 10 obtainable by the adoption of a thrust control device, the hydraulic circuit of which is shown in FIG. 9.

The hydraulic circuit shown in FIG. 9 is arranged so that when both workpieces are brought into a weldable state by the generation of frictional heat at the contact surfaces therebetween, this state is detected by the movement of the subordinate platform and the detecting signal controls the thrust pressure to be applied to both workpieces.

The above-mentioned effectively weldable state can also be detected by the rotational speed of the subordinate spindle system or by the lapse of time from initial contact of both workpieces.

The following explanation of a further embodiment of the present invention shown in FIG. 9 will be described based upon the detection of the above-mentioned movement of subordinate platform.

Referring to FIG. 9, piston rod 72 of hydraulic cylinder 71 is generally connected to the subordinate platform of a rotary type bi-axle friction welding apparatus.

To the working line (L1) of hydraulic cylinder 71, there are connected in series, a directional control valve 73, a flow-control valve 74, a pressure-reducing valve 75, a directional control valve 76 and a pump 77. Also, a pressure-reducing valve 78 and a check valve 79 are arranged on lines (L2) and (L3) in parallel with flow-control valve 74 and pressure-reducing valve 75.

Pressure-reducing valve 78 has a set value higher than pressure-reducing valve 75.

A safety valve 80 is provided between directional control valve 76 and pump 77.

Reference numeral 81 shows a reservoir, and reference symbol (L4) shows a working line provided between hydraulic cylinder 71 and directional control valve 76 for the purpose of returning the piston rod 72.

In the initial friction welding process, the hydraulic thrust control device having the above-mentioned arrangement is actuated through lines (L1) and (L4) from approximately the initial moment of contact of both workpieces held by the main spindle system and the subordinate spindle system of the rotary type biaxle friction welding apparatus of the present invention.

That is to say, pressure fluid supplied by pump 77 passes into working line (L1) by way of the directional control valve 76 according to energization of solenoid (a) of directional control valve 76 and then, it is reduced in pressure by pressure-reducing valve 75 and its rate of flow is reduced by the flow-control valve 74 and thereafter, the fluid is fed to the pressurized side (that is, the right hand side in the drawing) of the hydraulic cylinder 71 via directional control valve 73. As the hydraulic fluid which has passed through flow-control valve 74, is restricted in its flow, the piston rod 72 in the hydraulic cylinder 71 slowly advances and therefore, the subordinate platform to which is coupled piston rod 72 advances also at a slow rate so that the workpiece held in the subordinate platform side comes smoothly into contact with the workpiece held in the main platform side while positively rotating.

Therefore, the workpiece of the subordinate platform follows the rotation of the workpiece of the main platform while being kept under a thrust P1 as shown in FIG. 10 so as to increase the rotational speed necessary to reach the effective weldable state accompanied by generation of frictional heat at the contact surfaces.

The advancing of the above-mentioned initial welding process is detected by a suitable detector of physical quantities such as the rotational speed of the subordinate spindle system, the amount of upsets of both workpieces, the amount of movement of the subordinate platform from the moment of initial contact of both workpieces.

When both workpieces reach the effective weldable state, the solenoid of the directional control valve 73 is energized by the signal from the above-mentioned detector and thereby, the flow of the fluid is switched from line (L1) to the high pressure line (L2). Thus, the hydraulic pressure applied to hydraulic cylinder 71 increases so that the thrust acting between both workpieces increases from the value P1 to the value P2.

Also, as line (L2) in contrast with line (L1) does not restrict the flow of fluid, the quantity of the fluid flowing along the line (L2) increases and therefore, piston rod 72 of the hydraulic cylinder 71 increases its speed of advance, and consequently the increased speed can result in relatively high thrust and relatively high rotational relative speed between both workpieces which is required for effective welding.

Of course, pump 77 must have enough power to produce the above-mentioned required pressure and flow of fluid.

During the above-mentioned process, hydraulic fluid on the drain side (that is, the left hand side in the drawing) of the hydraulic cylinder 71 returns to the reservoir 81 by way of line (L4) and directional control valve 76.

In order to retract the subordinate platform after completion of the friction welding process, the solenoid (b) of directional control valve 76 which is restored to the state as shown in FIG. 9 when the frictional welding is completed, is energized to switch the directional control valve 76 into its returning direction, thus hydraulic fluid is supplied from pump 77 to the hydraulic cylinder 71 at its drain side by way of directional control valve 76 and line (L4) so as to retract the piston rod 72 in cylinder 71. At this time, the hydraulic fluid remaining at the pressurized side of hydraulic cylinder 71 enters line (L3) by way of line (L1) and directional control valve 73 and returns to reservoir 81 by way of check valve 79 and directional control valve 76.

According to the two stage pressure method obtained from the above-mentioned thrust control device, as thermal drop which tends to occur at the junction of workpieces at the end stage of the friction welding, is completely compensated for and also, as the synchronization of both workpieces is rapidly carried out, even a poor weldable material such as heat resisting material is capable of being welded so that the junction of the workpieces possesses very high strength without forming cracks at the junction.

Further, as the thrust control apparatus according to the present embodiment is arranged so that not only is the flow of fluid fed to the hydraulic cylinder increased but also the thrust applied to both workpieces is increased, the friction welding apparatus according to the present invention completely follows the rapid advancement of the upsets of workpieces to be welded and therefore, the drop of thrust which momentarily occurs in the friction welding process, can be eliminated.

Also, for workpieces which do not require removal of the welding fin or for which it is impossible to remove the welding fin during the friction welding process, a welding method where the second workpiece of the subordinate spindle system is completely prevented from rotation by the brake means and is welded to the first workpiece by the above-mentioned two stage pressure process and the process of immediately stopping the rotation of the main spindle system, may be carried out according to the present invention.

In the above-mentioned description, the case in which the second thrust P2 is higher than the first thrust P1 is explained. However, when workpieces having relatively small diameters are welded, the axial thrust acting between the workpieces to be welded and the frictional torque acting at the contact surface are small, and accordingly, the first and the second thrusts P1 and P2 can be equal.

However, in this case, the flow of fluid fed to the hydraulic cylinder must still be increased when considering the rapid advancement of upsets of both workpieces at the end process of friction welding, and according to the above-mentioned thrust control device of the present invention, the increase of fluid flow can easily be carried out while keeping thrust P1 constant during the full process of friction welding.

That is to say, as shown in FIG. 9, by arranging a bypass line (L5) and deleting line (L2) including the pressure-reducing valve 78 or by mechanically opening the flow-control valve 74 after the contact of both workpieces, the required effect can be obtained.

In the above-mentioned description, the hydraulic control device is mounted on the subordinate platform; however it will be understood that mounting the device on the main platform can of course result in the same effect.

What is claimed is:

1. In an apparatus for friction welding of the type including a machine bed, a main spindle supported on the machine bed for holding a first workpiece to be welded, a drive source for rotating said main spindle at a given speed, a rotatable subordinate spindle supported on said machine bed so as to be opposite said main spindle on a common axis, said subordinate spindle being adapted to hold a second workpiece to be welded to said first workpiece, and means for moving one of said main and subordinate spindles toward the other along said common axis to bring the second rotatable workpiece into contact with the first workpiece under an axial thrust;

the improvement comprising means for producing a signal responsive to a change of a physical value which changes with an increase of the amount of upsetting of said workpieces during welding from the initiation of the friction welding, and means for disconnecting said main spindle from said drive source in response to said signal from said signal producing means, thereby releasing said first workpiece to rotate freely with said second workpiece.

2. An apparatus as set forth in claim 1, further comprising means for releasably rotation of said subordinate spindle.

3. An apparatus as set forth in claim 2 wherein said restraining means comprises braking means coupled to said subordinate spindle for applying a braking force to said subordinate spindle.

4. An apparatus as set forth in claim 3 wherein said apparatus further comprises means for releasing the braking force of said braking means simultaneously with the disconnecting of said main spindle from said drive source by said disconnecting means.

5. An apparatus as set forth in claim 3 wherein said braking means comprises a hydraulically operated disc brake.

6. An apparatus as set forth in claim 3 wherein said braking means comprises means for controlling the amplitude of the partial braking force applied to said subordinate spindle.

7. An apparatus as set forth in claim 6 wherein said controlling means comprises a hydraulic control system for controlling the brake force to a predetermined value.

8. An apparatus as set forth in claim 2 wherein said restraining means comprises driving means releasably connected to said subordinate spindle for rotating said subordinate spindle at a speed lower than the given speed of the rotation of said main spindle thereby maintaining rotation of the second workpiece at a speed lower than the rotational speed of the first workpiece while enabling both said workpieces to be machine trimmed.

9. An apparatus as set forth in claim 8 wherein said apparatus further comprises means for releasing said subordinate spindle from connection to said driving means in response to said signal from said signal producing means, thereby allowing said second workpiece to rotate with said freely rotating first workpiece.

10. An apparatus as set forth in claim 9 wherein said driving means comprises a drive motor, and said releasing means comprises a clutch means.

11. An apparatus as set forth in claim 1 wherein said means for moving comprises hydraulic thrust control means for enabling said main and subordinate spindles to mutually approach each other while preventing drop of the axial thrust during an increase in the amount of upsetting of said first and second workpieces.

12. An apparatus as set forth in claim 11 wherein said hydraulic thrust control means includes means for setting the axial thrust at a relatively small value during the initial stage of upsetting of said workpieces and at a relatively large value during the end stage of upsetting of said workpieces, and said means for moving is provided with operating means responsive to the signal from said signal producing means for switching said axial thrust from the small value to the large value.

13. An apparatus as set forth in claim 2 wherein said means for moving comprises hydraulic thrust control means for setting the axial thrust at a relatively small value during the initial stage of the friction welding and at a relatively large value during the end stage of the friction welding, and said means for moving comprises operating means responsive to the signal from said signal producing means for switching said axial thrust from the small value to the large value.

14. An apparatus for friction welding of workpieces comprising:
    a fixed machine bed;
    a main spindle supported on the machine bed and having a chuck for a first workpiece;
    a drive motor for rotating the main spindle at a given selected speed;
    a subordinate spindle rotatably supported on the machine bed in a position facing the main spindle of a common axis, said subordinate spindle having a chuck for a second workpiece;
    means for moving said main and subordinate spindles with respect to each other on the machine bed and along the common axis thereby enabling the first and second workpieces to contact each other under an axial thrust;
    a cutting tool disposed adjacent to the position where the first and second workpieces come into contact with each other, said cutting tool serving to remove the welded fin produced in the contact portion of said workpieces, and
    means for restraining rotation of said subordinate spindle from reaching the given speed of the rotation of said main spindle.

15. An apparatus as set forth in claim 14 further comprising means for detecting the amount of a physical value that changes with an increase of the amount of upsetting of said workpieces during welding, said detecting means comprising means producing a signal when said amount of the physical value reaches a predetermined value, and
    means for releasing the restraint of rotation of said subordinate spindle by said restraining means in response to the signal from said detecting means, whereby rotation of said second workpiece is rapidly synchronized with rotation of said first workpiece.

16. An apparatus as set forth in claim 15 wherein said restraining means comprises braking means coupled with said subordinate spindle for applying a partial brake to said subordinate spindle, and said releasing means comprises clutch means disposed between said subordinate spindle and said braking means.

17. An apparatus as set forth in claim 15 wherein said restraining means comprises a drive motor connected to said subordinate spindle for rotating said subordinate spindle at a speed lower than said given selected speed of said main spindle but enabling said cutting tool to remove said welded fin of said workpieces, a transmission connecting said drive motor to said subordinate spindle and wherein said releasing means comprises a clutch means disposed between said subordinate spindle and said transmission.

18. An apparatus as set forth in claim 15, wherein said moving means comprises hydraulic thrust control means for enabling said main and subordinate spindles to mutually approach each other while preventing drop of the axial thrust during an increase of the amount of upsetting of said first and second workpieces.

19. An apparatus as set forth in claim 18 wherein said hydraulic thrust control means comprises means for setting the axial thrust at a realitively small value during the initial stage of upsetting of said workpieces and at a relatively large value during the end stage of upsetting of said workpieces, and said moving means are provided with operating means responsive to said signal from said detecting means for switching said axial thrust from said small value to said large value.

20. An apparatus as set forth in claim 15, wherein said detecting means comprises a limit switch fixed on the machine bed and an actuating dog for actuating said limit switch when the sum of the lengths of both workpieces reaches a value predetermined in accordance with the mutually approaching movement of both said workpieces.

21. An apparatus as set forth in claim 14 wherein said main spindle is provided with a first spindle part connected to the drive motor, a second spindle part having said chuck for the first workpiece, and a clutch for transmitting rotation of said first spindle part to said second spindle part upon being connected.

22. An apparatus as set forth in claim 21 further comprising means for detecting the amount of a physical value that changes with an increase of the amount of upsetting of said workpieces during welding, said detecting means comprising means producing a signal when said amount of the physical value reaches a predetermined value, and means for disconnecting the clutch of the main spindle in response to the signal from said detecting means thereby enabling free rotation of the first workpiece.

* * * * *

UNITED STATES PATENT OFFICE
CERTIFICATE OF CORRECTION

Patent No. 3,954,215      Dated May 4, 1976

Inventor(s) Nobuo Takagi, et al

It is certified that error appears in the above-identified patent and that said Letters Patent are hereby corrected as shown below:

Column 1, line 52: After "ation" insert a comma.

Column 5, line 7: Change "base 16 when" to --base 16. When--.

line 57: Change "disconnected" to --disconnecting--.

Column 11, line 54: Delete "partial".

Signed and Sealed this

Twenty-fourth Day of May 1977

[SEAL]

Attest:

RUTH C. MASON
*Attesting Officer*

C. MARSHALL DANN
*Commissioner of Patents and Trademarks*